United States Patent
Yoneya

(10) Patent No.: US 6,554,191 B2
(45) Date of Patent: Apr. 29, 2003

(54) DATA ENTRY METHOD FOR PORTABLE COMMUNICATIONS DEVICE

(76) Inventor: Akihiko Yoneya, 301 Casaverde, 2-58-5, Umetsubo-cho, Toyota-shi, Aichi-ken 471-0064 (JP)

(*) Notice: Subject to any disclaimer, the term of this patent is extended or adjusted under 35 U.S.C. 154(b) by 0 days.

(21) Appl. No.: 09/818,061

(22) Filed: Mar. 26, 2001

(65) Prior Publication Data
US 2001/0054972 A1 Dec. 27, 2001

(30) Foreign Application Priority Data
Apr. 28, 2000 (JP) ........................................ 2000-128679

(51) Int. Cl.[7] ................................................ G06K 7/10
(52) U.S. Cl. .................. 235/472.01; 379/368; 379/355; 341/22; 340/365
(58) Field of Search ................. 235/472.01, 8, 235/12, 15, 27, 59 R, 60 R, 62 A; 710/67; 455/566; 379/368, 355; 341/27, 23; 345/168

(56) References Cited

U.S. PATENT DOCUMENTS

| | | | | |
|---|---|---|---|---|
| 3,967,273 A | * | 6/1976 | Knowlton | 341/22 |
| 5,661,476 A | * | 8/1997 | Wang et al. | 341/22 |
| 5,991,396 A | * | 11/1999 | Salm et al. | 379/355.09 |
| 6,219,731 B1 | * | 4/2001 | Gutowitz | 710/67 |
| 6,223,059 B1 | * | 4/2001 | Haestrup | 455/566 |
| 6,483,913 B1 | * | 11/2002 | Smith | 379/368 |

FOREIGN PATENT DOCUMENTS

EP 0776140 A1 * 5/1997

\* cited by examiner

*Primary Examiner*—Michael G. Lee
*Assistant Examiner*—Daniel Walsh

(57) ABSTRACT

A character data entry method using a set of key groups where the keys are located densely is disclosed, comprising the steps of: (a) selecting one or no key in each key group touching some or no keys in each key group; (b) checking the selected character that is determined with the combination of the selected keys from each key group; (c) searching the desired character changing the selected keys by sliding the touching fingers; and (d) enter the desired character by getting one of the touching fingers off the keys.

3 Claims, 3 Drawing Sheets

Front     Rear

TABLE 1

|    | C1  | C2  | C3  | C4  | C5  | C6  | C7  | C8  | C9  | C0  |
|----|-----|-----|-----|-----|-----|-----|-----|-----|-----|-----|
| V1 | "a" | "d" | "g" | "j" | "+" | "m" | "p" | "t" | "w" | "?" |
| V2 | "b" | "e" | "h" | "k" | "-" | "n" | "q" | "u" | "x" | "!" |
| V3 | "c" | "f" | "i" | "l" | "*" | "o" | "r" | "v" | "y" | "@" |
| V4 | "<" | """ | "(" | "#" | "/" | ">" | "s" | ")" | "z" | ":" |
| V5 | "[" | "_" | "{" | "%" | "=" | "]" | "&" | "}" | "\" | ";" |

TABLE 2

|    | C1  | C2  | C3  | C4  | C5  | C6  | C7  | C8  | C9  | C0  |
|----|-----|-----|-----|-----|-----|-----|-----|-----|-----|-----|
| V1 | "A" | "D" | "G" | "J" | "+" | "M" | "P" | "T" | "W" | "?" |
| V2 | "B" | "E" | "H" | "K" | "-" | "N" | "Q" | "U" | "X" | "!" |
| V3 | "C" | "F" | "I" | "L" | "*" | "O" | "R" | "V" | "Y" | "@" |
| V4 | "<" | """ | "(" | "#" | "/" | ">" | "S" | ")" | "Z" | ":" |
| V5 | "[" | "_" | "{" | "%" | "=" | "]" | "&" | "}" | "\" | ";" |

TABLE 3

|    | C1 / C6 | C2 / C7 | C3 / C8 | C4 / C9 | C5 / C0 |
|----|---------|---------|---------|---------|---------|
| V1 | ","     | "$"     |         |         |         |
| V2 | "`"     | "\|"    |         |         |         |
| V3 | "^"     |         |         |         |         |
| V4 | "~"     |         |         |         |         |
| V5 |         |         |         |         |         |

TABLE 4

| C1 | C6 | shift |
|----|----|-------|
| C2 | C7 |       |
| C3 | C8 |       |
| C4 | C9 |       |
| C5 | C0 |       |

TABLE 5

| V1 | space  |
| V2 | return |
| V3 | BS     |
| V4 | ","    |
| V5 | "."    |

TABLE 6

| C1 | "1" |
| C2 | "2" |
| C3 | "3" |
| C4 | "4" |
| C5 | "5" |

TABLE 7

| C6 | "6" |
| C7 | "7" |
| C8 | "8" |
| C9 | "9" |
| C0 | "0" |

FIG. 3

| Previous status | Current status | | | | | |
|---|---|---|---|---|---|---|
| | nv: 0<br>nc: 0 | nv: 1<br>nc: 0 | nv: 0<br>nc: 1 | nv: 1<br>nc: 1 | nv: 0<br>nc: 2 | nv: 1<br>nc: 2 |
| N00 | N00 | G10 | G01 | G11 | G02 | G12 |
| N10 | N00 | N10 | G01 | G11 | G02 | G12 |
| G10 | N00+ | G10 | G01+ | G11 | G02+ | G12 |
| N01 | N00 | G10 | N01 | G11 | G02 | G12 |
| G01 | N00+ | G10+ | G01 | G11 | G02 | G12 |
| N11 | N00 | G10 | N01 | N11 | N02 | G12 |
| G11 | N00+ | N10+ | N01+ | G11 | G02+ | G12 |
| N02 | N00 | G10 | N01 | G11 | N02 | G12 |
| G02 | N00+ | G10+ | G01 | G11+ | G02 | G12 |
| G12 | N00+ | N10+ | N01+ | G11 | N02+ | G12 |

DATA ENTRY METHOD FOR PORTABLE COMMUNICATIONS DEVICE

CROSS-REFERENCE TO RELATED APPRICATION

| Reference Cited U.S. Patent Documents | | |
|---|---|---|
| 4310753 | Jun. 13, 1979 | Fischer |
| 5515305 | May 7, 1996 | Register, et al. |
| 5552782 | Sep. 3, 1996 | Horn |
| 5793312 | Aug. 11, 1998 | Tsubai |
| 5993089 | Nov. 30, 1999 | Burrell, IV |

STATEMENT REGARDING FEDERALLY SPONSORD RESEARCH OR DEVELOPMENT

Not Applicable.

REFERENCE TO A MICROFICHE APPENDIX

Not Applicable.

BACKGROUND OF THE INVENTION

The present invention relates to data entry system, especially for cellular phones and personal digital assistants.

It has been desired to develop a data entry method applicable to portable electric devices like the cellular phones, palm top computers and so on. Such devices have narrow areas to implement the keys for data entry.

One of the proposed approaches for such a problem is to use small size keys, and special feature key tops are proposed (U.S. Pat. No. 4,310,753). Using this type of key tops, many keys can be implemented in a narrow area, but it is not easy to realize a comfortable data entry circumstance.

Another approach is to enter information like a character code or a function with a combination of the plural selected keys, so called chord method (U.S. Pat. Nos. 5,515,305, 5,552,782, 5,793,312, 5,993,089). But a log time practice is required to be skilled to use a chord type keyboard, because the user needs to remember the key combination for all characters. Furthermore a cellular phone is too small to implement a chord keyboard system with comfortable size keys.

BRIEF SUMMARY OF THE INVENTION

With the present invention, character data are entered with two finger operations to a set of keys consists of three key groups. A key or none is selected from each key group by touching the keys, and the character to be entered is determined as the combination of the selected keys. The determined character is entered when one or two fingers release all the depressing keys.

There is a rule to select a key from the key group when plural keys are depressed in the key group. Therefor the keys can be arranged to a narrow area densely.

With the present invention, the status of the key operation, e.g. which keys are selected and/or which character is selected, is displayed. Therefor the operator can search right key operation looking at such display and, after that, the operator can enter the desiring character by releasing one of the fingers. So the keys can be arranged highly densely, and the operator needs not remember the key combination for all the characters to use.

By displaying a set of candidates of the characters to be determine, those are the set of the characters correspond to the set of the keys in a key group, the operator can search the desiring character rapidly.

With the reasons stated above, a comfortable data entry environment can be realized with a cellular phones utilizing the present invention.

BRIEF DESCRIPTION OF THE SEVERAL VIEWS OF THE DRAWING

FIG. 3 is a set of tables of assigned characters.

DETAILED DESCRIPTION OF THE INVENTION

The present invention is described with an embodiment for a cellular phone.

Figure 1:
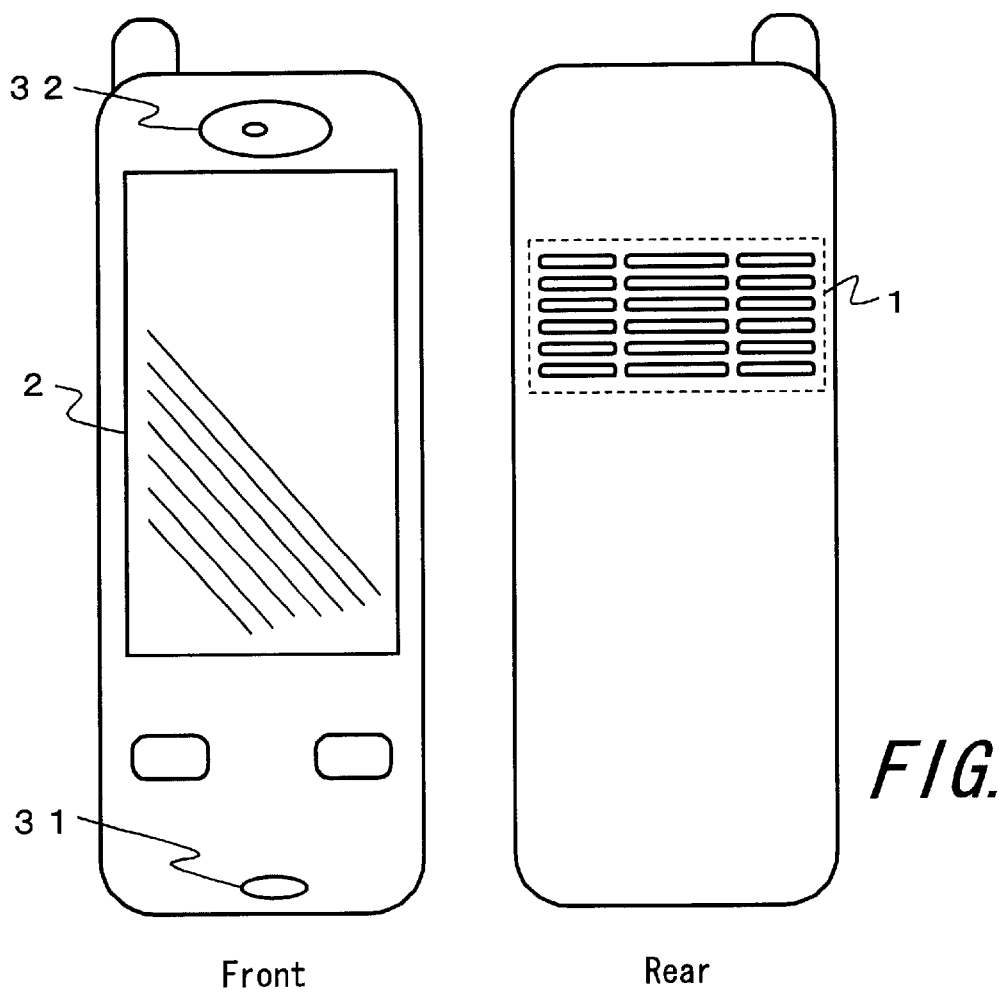
FIG. 1 shows an appearance of a cellular phone installing the present invention.

FIG. 1 shows an appearance of a cellular phone that the embodiment of the present invention is installed. The cellular phone comprising a set of key groups 1, a display device 2, a microphone 31 and a speaker 32. The cellular phone has a function to enter text data by operating the set of key groups 1, and the entered data and the state of the operation of the set of key groups 1 are displayed on the display device 2.

Figure 2:
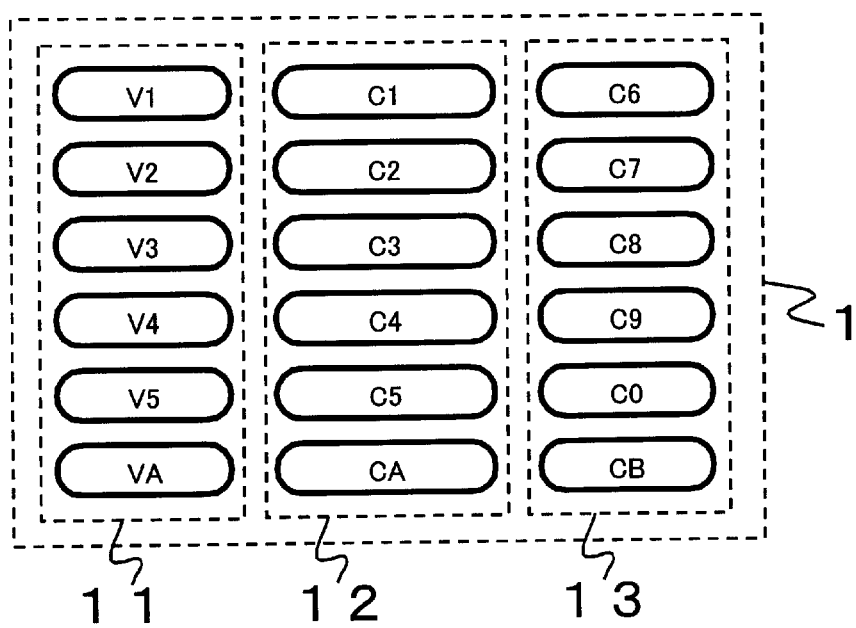
FIG. 2 shows the key names and the key groups.

The set of key groups 1 consists of three key groups 11, 12, 13, and each key group consists of six keys (FIG. 2). Each key is named as shown in FIG. 2. When the set of keys are operated with operator's right hand, key group 11 is operated with operator's middle finger and key group 12 and key group 13 are operated basically with operator's index finger.

At each key group 11, 12, 13, none or one key is selected by touching the keys. When plural keys in a key group are touched, the highest positioned key in FIG. 2 among the touched keys is considered selected. So the keys in the set of key groups 1 can be arranged densely. The interval of the rows of the keys is 2.54 mm.

The tables of the characters to be selected corresponding to the set of the selected keys are shown in FIG. 3. The key names, V1, V2, V3, V4, V5, C1, C2, C3, C4, C5, C6, C7, C8, C9 and C0 are as shown in FIG. 2. There are two modes, normal mode and shift mode, to enter character data. TABLE 1 in FIG. 3 is for the normal mode and TABLE 2 in FIG. 3 is for the shift mode. TABLE 2, TABLE 4, TABLE 5, TABLE 6 and TABLE 7 in FIG. 3 are common in both the normal mode and the shift mode. "shift" is the instruction to change the mode to shift mode for the next enter of the character. When key V4 is selected in key group 11, key C1 is selected in key group 12 and none is selected in key group 13, the character "<" will be selected. When key V4 is selected in group 11, none is selected in key group 12 and key C8 is selected in key group 13, the character ")" will be selected. When key V1 is selected in key group 11, key C2 is selected in key group 12 and key C7 is selected in key group 13, the character "$" will be selected. When none is selected in key group 11, key C1 is selected in key group 12 and key C6 is selected in key group 13, the instruction "shift" will be selected. When none is selected in key group 11, key C1 is selected in key group 12 and none is selected in key group 13, the character "1" will be selected. When key VA is selected, key CA is selected or key CB is selected, no character or instruction will be selected.

Figures 4, 5:
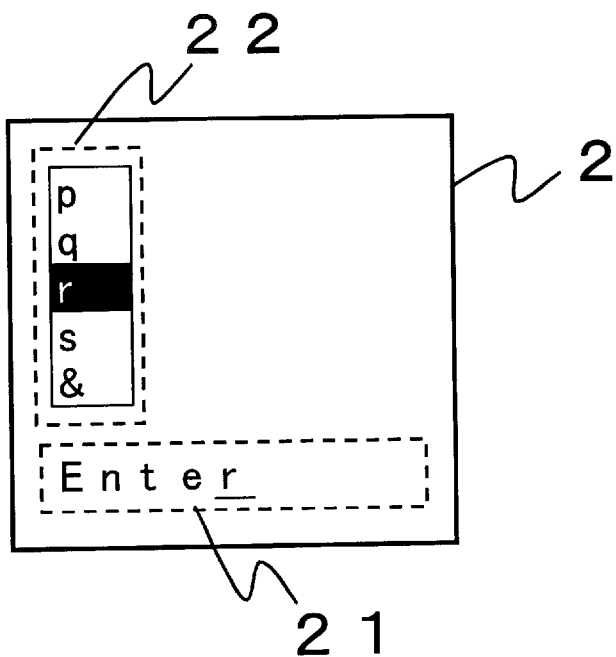
FIG. 4 is an example of the state transition table for the code generation.
FIG. 5 shows an example of the display contents.

An example of the state transition table to determine when the code of the selected character or the selected instruction is generated is shown in FIG. 4. The variable nv takes value 0 when no key is selected in key group 11 and takes value 1 when a key is selected in key group 11. The variable nc is the number of the selected keys in key group 12 and key group 13. There are 10 states, N00, N10, G10, N01, G01, N11, G11, N02, G02 and G12. The current status is determined with the previous status and the current values of nv and nc. In the transition table in FIG. 4, "+" at the end of the status name means the code generation. For example, when the previous state is G11 and the current values of nv and nc are 1 and 0, respectively, the new status will be N10 and a code will be generated, which means the selected character or the selected instruction will be entered. The character or the instruction to be entered is the character or the instruction selected at the moment a certain time before the state transition that the code generation occurs.

In each key group, the keys are located too densely to touch only one key for an operator except for the case of keys VA, CA and CB, and the operator can change the selecting keys by sliding his/her fingers without getting his/her fingers off the keys. So the operator can change the selected character without entering any character. As mentioned later, the selected character is displayed, and operator can enter the correct character after verifying the selected character.

No character is assigned when, at least, one of keys VA, CA and CB is involved in the selected keys. Therefore the operator can get his/her fingers off the keys without entering any character or instruction by selecting one of keys VA, CA and CB just before getting the fingers off the keys.

An example of the contents of the display for text input is shown in FIG. 5. The display has two regions: text display region 21 and manipulation display region 22. In the text display region 21, the entered text and the currently selecting character are displayed. In the manipulation display region 22, the state of manipulation is displayed. The text "Ente" has been entered and now the character "r" is selected. At this time, key V3 is selected in key group 11 with the operator's middle finger and key C7 is selected in key group 13 with the operator's index finger. In key group 12, no key is selected. The selected character "r" is displayed with an underline following the entered text in the text display region 21. If the selected character is changed, the newly selected character may be displayed in the text display region 21 in real time. In the manipulation display region, the characters corresponding to the selected key C7 in key group 11 or key group 12 are displayed: these are "p" corresponding to key V1, "q" to V2, "r" to V3, "s" to V4 and "&" to V5. The color of the part corresponding to the selected key V3 is reversed to show the selected character and the selected key in key group 11 to the operator. The operator can choose the character to be entered from the displayed characters in the manipulation display region 21 by changing the selecting key in key group 11. If the desired character is not included in the displayed characters in the manipulation display region 22, it means the selecting key in key group 12 or in key group 13 is wrong. In such a case, the operator may change the selecting key in key group 12 or key group 13 to find the desired character. With the condition shown in FIG. 4, the selected character "r" will be entered by releasing the operator's index finger, which is selecting a key in key group 11, or the operator's middle finger, which is selecting a key in key group 13.

What I claim as my invention is:

1. A method of entering information, comprising:
   (1) a plurality of key groups wherein each said key group consists of plural keys;
   (2) a selection of the keys wherein:
      (i) one or no said key is selected from each said key group;
      (ii) a said key is selected from a said key group when one or plural said keys which belong to the same key group are depressed;
      (iii) a said key is selected from the key group among the depressed keys in the key group; and
      (iv) no said key is selected from the key group when no said key which belongs to the key group is depressed;
   (3) key selection states each of which is defined on a set of states whether a said key is selected or not at each group; and (4) the steps of:
      (a) detecting an event that the status of each said key group is changed from the status one or plural said keys are depressed to the status any of the keys is not depressed at least at one of the key groups;
      (b) determining the information to be entered based on a set of the plural keys selected at a moment just before the event of step (a) occurred;
      (c) judging whether data entry is enabled or not by a transition of the key selection state and the sequence of the transition; and
      (d) entering the determined information if the data entry is enabled.

2. The method of claim 1, wherein the information is entered by using three key groups.

3. The method of claim 1, wherein the information determined based on the combination of the selected keys in each key group is displayed in real time.

* * * * *